(12) United States Patent
Park et al.

(10) Patent No.: US 11,592,207 B2
(45) Date of Patent: Feb. 28, 2023

(54) CONDENSATE TRAP FOR GAS FURNACE

(71) Applicant: LG ELECTRONICS INC., Seoul (KR)

(72) Inventors: Hansaem Park, Seoul (KR); Jusu Kim, Seoul (KR); Janghee Park, Seoul (KR); Yongki Jeong, Seoul (KR); Doyong Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/266,578

(22) PCT Filed: Aug. 8, 2019

(86) PCT No.: PCT/KR2019/010003
§ 371 (c)(1),
(2) Date: Feb. 6, 2021

(87) PCT Pub. No.: WO2020/032642
PCT Pub. Date: Feb. 13, 2020

(65) Prior Publication Data
US 2021/0310697 A1    Oct. 7, 2021

(30) Foreign Application Priority Data
Aug. 9, 2018  (KR) .................. 10-2018-0092985

(51) Int. Cl.
*F24H 8/00*  (2022.01)
*F24H 9/20*  (2022.01)
(Continued)

(52) U.S. Cl.
CPC ........... *F24H 8/006* (2013.01); *F24H 9/2085* (2013.01); *F16T 1/00* (2013.01); *F16T 1/12* (2013.01);
(Continued)

(58) Field of Classification Search
CPC ........ F24H 3/087; F24H 8/006; F24H 9/0036; F24H 9/2085; Y02B 30/00; F16T 1/00; F16T 1/12; F16T 1/383
(Continued)

(56) References Cited

U.S. PATENT DOCUMENTS 5,379,749 A * 1/1995 Rieke ..................... F24H 8/006
                                                137/247.27
5,704,343 A * 1/1998 Ahn ....................... F24H 8/006
                                                126/11 OR
(Continued)

FOREIGN PATENT DOCUMENTS

JP    2014-184952    10/2014
KR  10-2002-0028306   4/2002
(Continued)

OTHER PUBLICATIONS

Translation of KR 101381699 B1.*
International Search Report (with English Translation) and Written Opinion dated Nov. 27, 2019 issued in Application No. PCT/KR2019/010003.

*Primary Examiner* — Steven B McAllister
*Assistant Examiner* — Benjamin W Johnson
(74) *Attorney, Agent, or Firm* — KED & Associates

(57) ABSTRACT

The present disclosure relates to a condensate trap for a gas furnace for collecting and discharging condensate generated in a heat exchanger and an exhaust pipe, the condensate trap including: a first inlet through which the condensate generated in the heat exchanger is introduced; a second inlet through which the condensate generated in the exhaust pipe is introduced; a first passage through which the condensate introduced from the first inlet passes; a second passage through which the condensate introduced from the second inlet passes; a discharge port through which the condensate, having passed through the first passage and the second
(Continued)

passage, is discharged outside; and a backflow prevention device disposed on the first passage and configured to prevent backflow of air, wherein the backflow prevention device includes: a housing; and a core which is movably disposed in the housing, and which in response to an amount of the condensate introduced from the first inlet being less than or equal to a predetermined amount, prevents backflow of the air by closing the first passage.

8 Claims, 11 Drawing Sheets

(51) Int. Cl.
  *F24H 3/08* (2022.01)
  *F16T 1/00* (2006.01)
  *F16T 1/38* (2006.01)
  *F16T 1/12* (2006.01)
  *F24H 9/00* (2022.01)

(52) U.S. Cl.
  CPC ............... *F16T 1/383* (2013.01); *F24H 3/087* (2013.01); *F24H 9/0036* (2013.01)

(58) Field of Classification Search
  USPC ......................................................... 431/119
  See application file for complete search history.

(56) References Cited

U.S. PATENT DOCUMENTS

2009/0277206 A1\* 11/2009 Laufenberg ............. F16K 15/03
  62/285
2013/0118608 A1 5/2013 Holiday et al.

FOREIGN PATENT DOCUMENTS

| KR | 10-2011-0015903 | 2/2011 |
| KR | 10-1381699 | 4/2014 |
| KR | 101381699 B1 \* | 4/2014 |
| KR | 10-1781020 | 10/2017 |

\* cited by examiner

CONDENSATE TRAP FOR GAS FURNACE

CROSS-REFERENCE TO RELATED PATENT APPLICATIONS

This application is a U.S. National Stage Application under 35 U.S.C. § 371 of PCT Application No. PCT/KR2019/010003, filed Aug. 8, 2019, which claims priority to Korean Patent Application No. 10-2018-0092985, filed Aug. 9, 2018, whose entire disclosures are hereby incorporated by reference.

TECHNICAL FIELD

The following description relates to a condensate trap for a gas furnace, and more particularly to a condensate trap for a gas furnace, in which a backflow prevention device is installed in a condensate trap passage to prevent backflow of outside air into a heat exchanger, thereby allowing for smooth discharge of condensate generated in the heat exchanger.

BACKGROUND ART

Generally, a gas furnace is a device for heating indoor air by performing heat exchange between air, supplied indoors, and flame and high-temperature combustion gas which are produced during combustion of a fuel gas.

Particularly, in a condensing gas furnace which performs heat exchange between a combustion gas and indoor air until water vapor contained in the combustion gas is condensed, it is required a condensate trap for the gas furnace which collects and discharges the condensate generated in a heat exchanger and an exhaust pipe.

In a general condensate trap for a gas furnace, if negative pressure is formed in a heat exchanger compared to the outside atmospheric pressure, the outside air backflows into the heat exchanger, thereby causing a problem in that the condensate generated in the heat exchanger may not be discharged.

In order to solve the above problem, an air backflow prevention device is installed in the condensate trap to prevent backflow of the outside air, but if negative pressure is formed in the heat exchanger, a problem occurs in that the backflow of air may not be fundamentally prevented.

In addition, the air backflow prevention device, integrally formed with the condensate trap, may not be assembled or separated, such that the air backflow prevention device has poor compatibility with other condensate trap for a gas furnace, and is inconvenient in repair and maintenance.

DISCLOSURE

Technical Problem

It is a first object of the present disclosure to provide a condensate trap for a gas furnace, in which even when negative pressure is formed in a heat exchanger, it is possible to prevent backflow of outside air.

It is a second object of the present disclosure to provide a condensate trap for a gas furnace, which allows for easy assembly and separation of an air backflow prevention device.

The objects of the present disclosure are not limited to the aforementioned objects, and other objects not described herein will be clearly understood by those skilled in the art from the following description.

Technical Solution

In accordance with an aspect of the present disclosure, the above and other objects can be accomplished by providing a condensate trap for a gas furnace for collecting and discharging condensate generated in a heat exchanger and an exhaust pipe, the condensate trap including: a first inlet through which the condensate generated in the heat exchanger is introduced; a second inlet through which the condensate generated in the exhaust pipe is introduced; a first passage through which the condensate introduced from the first inlet passes; a second passage through which the condensate introduced from the second inlet passes; a discharge port through which the condensate, having passed through the first passage and the second passage, is discharged outside; and a backflow prevention device disposed on the first passage and configured to prevent backflow of air, wherein the backflow prevention device includes: a housing; and a core which is movably disposed in the housing, and which in response to an amount of the condensate introduced from the first inlet being less than or equal to a predetermined amount, prevents backflow of the air by closing the first passage.

The housing may include: a housing body having a tubular shape and a through hole formed in a vertical direction; and upper and lower stoppers protruding radially inward of upper and lower portions of the housing body, respectively, so as to limit upward and downward movements of the core.

The core may include: a core head coming into contact with the upper stopper to close the through hole; and a core body disposed below the core head and having a bottom surface coming into contact with the lower stopper.

The core body may be formed as a plate body having a hollow portion with a closed upper part and an open lower part, wherein at least one body hole may be formed on a side surface of the core body, so that the condensate introduced from the first inlet may pass through the hollow portion of the core body.

The condensate trap may further include upper and lower fixing parts protruding inwardly of the first passage, wherein the housing may be detachably installed between the upper and lower fixing parts.

Advantageous Effects

The condensate trap for a gas furnace according to the present disclosure has one or more of the following effects.

First, if an amount of the condensate introduced from the first inlet is less than or equal to a predetermined amount, the core closes the first passage by moving in the housing, such that even when negative pressure is formed in the heat exchanger, it is possible to prevent backflow of the outside air into the heat exchanger.

Second, the housing is detachably installed on the first passage, such that an air backflow prevention device may be easily assembled to or separated from the condensate trap for a gas furnace.

BEST MODE FOR INVENTION

Figure 3:
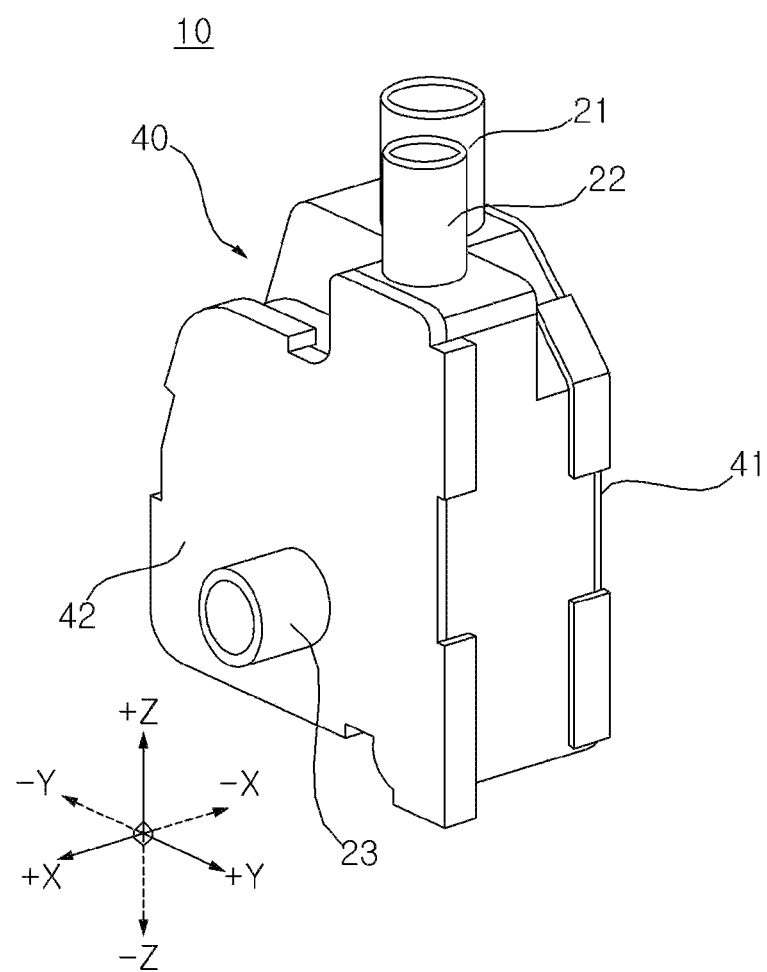
FIG. 3 is a perspective view of a condensate trap for a gas furnace according to an embodiment of the present disclosure.

The present disclosure will be described using a spatial orthogonal coordinate system with X, Y and Z axes arranged perpendicular to each other, as illustrated in FIG. 3 and other drawings. In the present disclosure, the X, Y and Z axes are defined based on the direction of the Z axis defined as an up-down direction and the direction of the X axis in which a discharge port 23 extends. Directions of the respective axes (directions of the X, Y, and Z axes) may indicate both directions in which each of the axes runs, in which +X axis direction, +Y axis direction, and +Z axis direction, each having a plus sign ("+"), may indicate a positive direction of the respective axes running in both directions; and −X axis direction, −Y axis direction, and −Z axis direction, each having a minus sign ("−"), may indicate a negative direction of the respective axes running in both directions.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms "comprise", 'include", "have", etc. when used in this specification specify the presence of stated features, integers, steps, operations, elements, components, or combinations of them but do not preclude the presence or addition of one or more other features, integers, steps, operations, elements, components, or combinations thereof.

Figure 1:
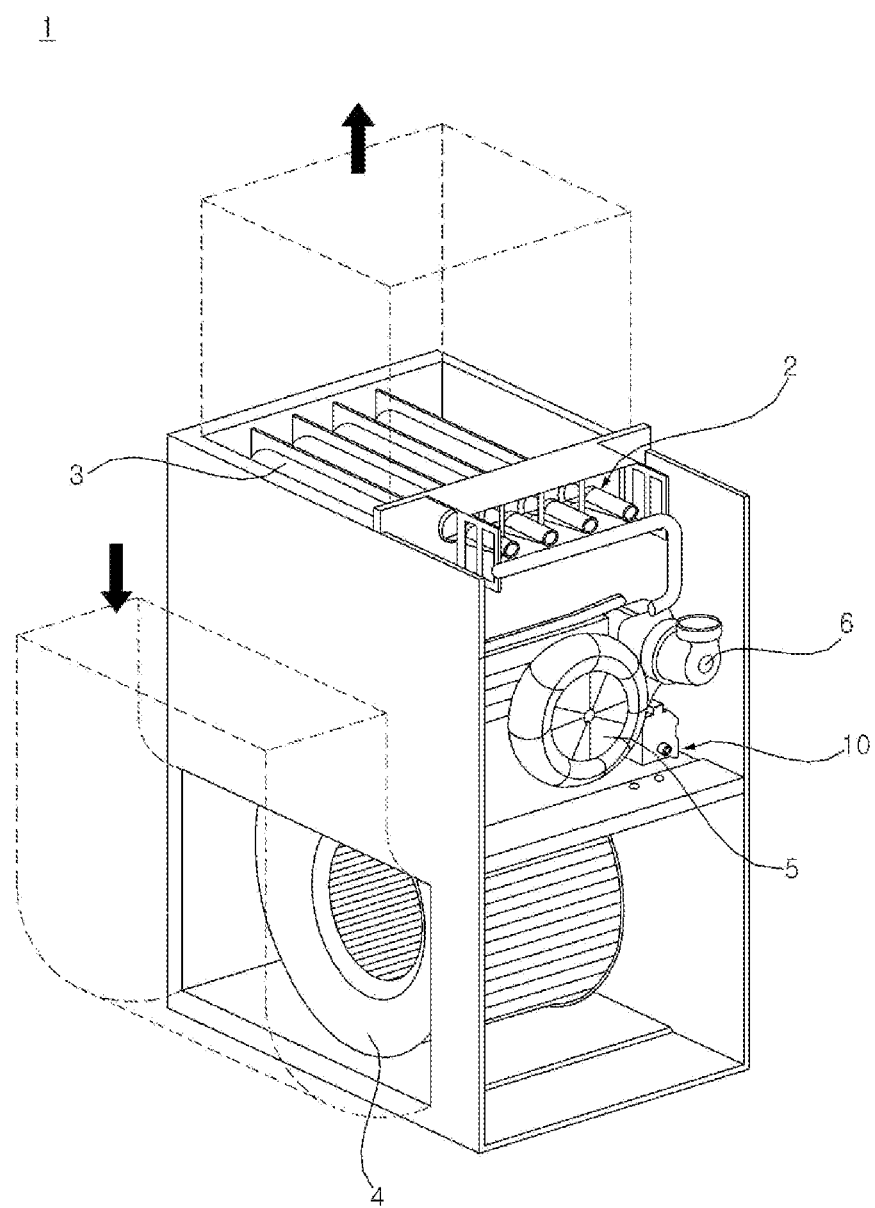
FIG. 1 is a perspective view of a gas furnace including a condensate trap for a gas furnace according to an embodiment of the present disclosure.
Figure 2:
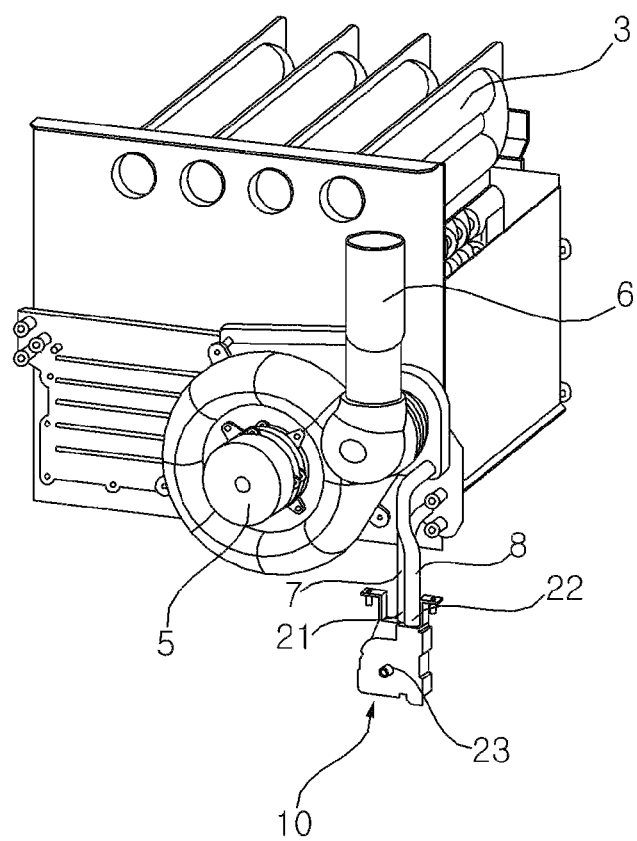
FIG. 2 is a perspective view of a portion of a gas furnace including a condensate trap for a gas furnace according to an embodiment of the present disclosure.

FIG. 1 is a perspective view of a gas furnace including a condensate trap for a gas furnace according to an embodiment of the present disclosure. FIG. 2 is a perspective view of a portion of a gas furnace including a condensate trap for a gas furnace according to an embodiment of the present disclosure.

Referring to FIGS. 1 and 2, a gas furnace 1 including a condensate trap 10 for a gas furnace according to an embodiment of the present disclosure will be described below.

The gas furnace 1 is a device for heating indoor air by performing heat exchange between air, supplied indoors, and flame and high-temperature combustion gas P which are produced during combustion of a fuel gas R.

As illustrated in FIG. 1, the gas furnace 1 includes a combustion unit 2 in which a combustion gas P is produced by combustion of the fuel gas R, a heat exchanger 3 having a gas passage through which the combustion gas P flows, a blower 4, and an inducer 5.

A flame and the combustion gas P may be produced by the combustion of the fuel gas R in the combustion unit 2. Here, as the fuel gas R, Liquefied Natural Gas (LNG) may be generally used, which is natural gas that has been cooled down to liquid form, or Liquefied Petroleum Gas (LPG) may be generally used, which is a by-product of crude oil refining and is pressurized into liquid form.

An indoor room may be heated by passing the air, supplied indoors, around the heat exchanger 3 through which the flame and the combustion gas P pass.

The heat exchanger 3 may include a primary heat exchanger and a secondary heat exchanger.

The primary heat exchanger may have one end disposed adjacent to the combustion unit 2. The other end of the primary heat exchanger, which is opposite to the one end, may be coupled to a coupling box (not shown). The combustion gas P, passing through the primary heat exchanger from the one end to the other end thereof, may be delivered to the secondary heat exchanger through the coupling box.

One end of the secondary heat exchanger may be coupled to the coupling box. The combustion gas P, having passed through the primary heat exchanger, may flow to the one end of the secondary heat exchanger, to pass through the secondary heat exchanger.

The secondary heat exchanger may perform once again heat exchange between the combustion gas P, having passed through the primary heat exchanger, and the air passing around the secondary heat exchanger.

That is, the thermal energy of the combustion gas P having passed through the primary heat exchanger may be further used by the secondary heat exchanger, thereby improving efficiency of the gas furnace 1.

The combustion gas P passing through the secondary heat exchanger is condensed by the transfer of heat to the air passing around the secondary heat exchanger, thereby forming condensate. In other words, water vapor contained in the combustion gas P is condensed and converted into condensate.

For this reason, the gas furnace 1 having the primary heat exchanger and the secondary heat exchanger may be referred to as a condensing gas furnace.

In this case, the generated condensate may be collected in a condensate collecting part (not shown). To this end, the other end of the secondary heat exchanger, which is opposite to the one end thereof, may be coupled to one side of the condensate collecting part.

The inducer 5, which will be described later, may be coupled to the other side of the condensate collecting part. For the convenience of explanation, the following description will be given using an example in which the inducer 5 is coupled to the condensate collecting part, but the inducer 5 may also be coupled to a mounting plate, to which the condensate collecting part is coupled.

An opening may be formed in the condensate collecting part. The other end of the secondary heat exchanger and the inducer 5 may communicate with each other through the opening formed in the condensate collecting part.

That is, the combustion gas P having passed through the other end of the secondary heat exchanger may flow to the inducer 5 through the opening formed in the condensate collecting part, and then may be discharged to the outside of the gas furnace 1 via an exhaust pipe 6.

The condensate generated in the secondary heat exchanger may flow to the condensate trap 10 for the gas furnace through the condensate collecting part, and then may be discharged to the outside of the gas furnace 1 through the discharge port 23 and a discharge pipe.

In this case, the condensate trap 10 may be coupled to the other side of the condensate collecting part. The condensate trap 10 may collect and discharge not only the condensate generated in the secondary heat exchanger but also the condensate generated in the exhaust pipe 6 connected to the inducer 5.

That is, the condensate, which is generated when the combustion gas P not yet condensed at the other end of the secondary heat exchanger, is condensed by passing through the exhaust pipe 6, may also be collected in the condensate trap 10 for the gas furnace and may be discharged to the outside of the gas furnace 1 through the discharge port 23.

The gas furnace 1 may include a backflow prevention device 60 for preventing backflow of air, which occurs due to negative pressure formed in the heat exchanger 3 compared to the outside atmospheric pressure when the gas furnace 1 is in operation. A detailed description thereof will be given later.

The inducer 5 may communicate with the other end of the secondary heat exchanger through the opening formed in the condensate collecting part.

One end of the inducer 5 is coupled to the other side of the condensate collecting part, and the other end of the inducer 5 may be coupled to the exhaust pipe 6.

The inducer 5 may induce a flow of the combustion gas P to pass through the primary heat exchanger, the coupling box, and the secondary heat exchanger and to be discharged to the exhaust pipe 6. In this respect, the inducer 6 may be understood as an Induced Draft Motor (IDM).

A blower 4 may allow the air to pass around the heat exchanger 3. Temperature of the air, passing around the heat exchanger 3 by the blower 4, may increase as the air receives thermal energy from a high-temperature combustion gas P through the heat exchanger 3. The indoor air may be heated as the air having an increased temperature is supplied indoors.

The blower 4 may be disposed at a lower portion of the gas furnace 1.

The air, which is supplied indoors, may move from the lower portion of the gas furnace 1 to the upper portion thereof by the blower 4. In this respect, the blower 4 may be understood as Indoor Blower Motor (IBM).

The gas furnace 1 may include a case (not numbered). Components of the gas furnace 1 may be accommodated in the case. At a lower portion of the case 70, a lower opening (not numbered) may be formed on a side surface adjacent to the blower 4. The air passing around the heat exchanger 3 may flow into the case through the lower opening.

At an upper portion of the case, an upper opening (not numbered) may be formed on a side surface adjacent to the upper side of the heat exchanger 3. Air, having an increased temperature while passing around the heat exchanger 3, may be discharged to the outside of the case through the upper opening to be supplied indoors.

The lower opening and the upper opening may be provided with a duct (not numbered) for allowing an indoor space to be heated to communicate with the gas furnace 1.

A filter (not shown) for filtering out foreign substances, such as dust and the like in the air, may be installed between the lower opening and the duct installed therein.

An opening (not numbered) for the exhaust pipe, through which the exhaust pipe 6 passes, may be formed in the upper portion of the case, but the position is not limited thereto.

As described above, the secondary heat exchanger is configured to further use the thermal energy of the combustion gas P having passed through the primary heat exchanger, such that it may be easily understood that the gas furnace including the primary and secondary heat exchangers has a higher efficiency than the gas furnace including only the primary heat exchanger.

The present disclosure relates to the condensate trap 10 for the gas furnace, which collects and discharges the condensate generated in the heat exchanger 3 and the exhaust pipe 6, such that the following description will be given of a condensing gas furnace 1 having both the primary and secondary heat exchangers.

However, as the present disclosure has as a subject matter the condensate trap 10 for the gas furnace, it may be easily understood that the description of the present disclosure will be focused on the secondary heat exchanger, in which condensate is formed, of the heat exchanger 3.

Hereinafter, the condensate trap 10 for the gas furnace according to the present disclosure will be described with reference to FIGS. 1 to 9.

A structure of the condensate trap 10 will be described in detail first, followed by a description of the backflow prevention device 60 according to the present disclosure.

Figure 4:
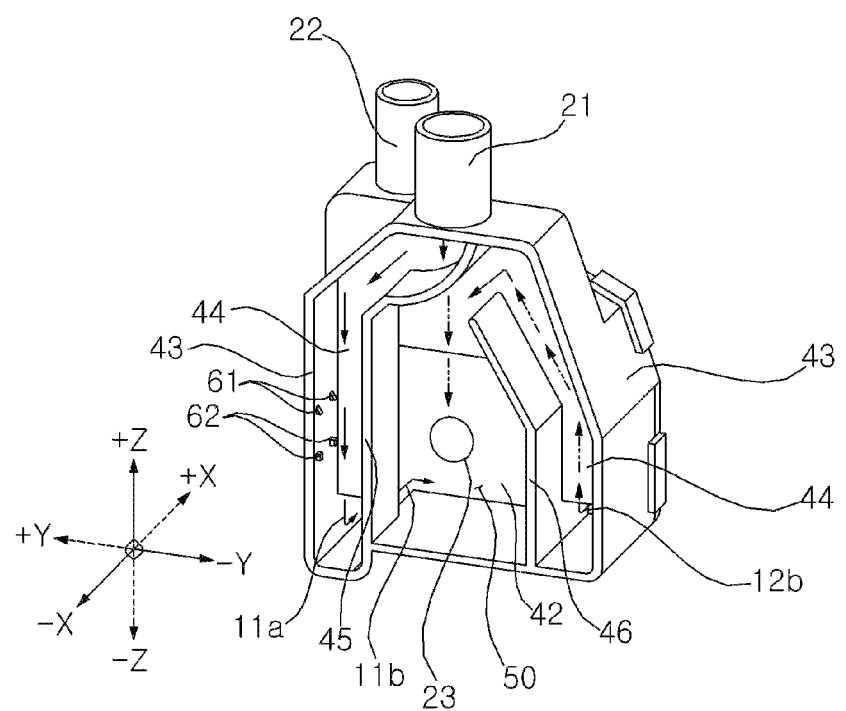
FIG. 4 is a perspective view of the condensate trap for a gas furnace of FIG. 3, from which a first cover is removed.
Figure 5:
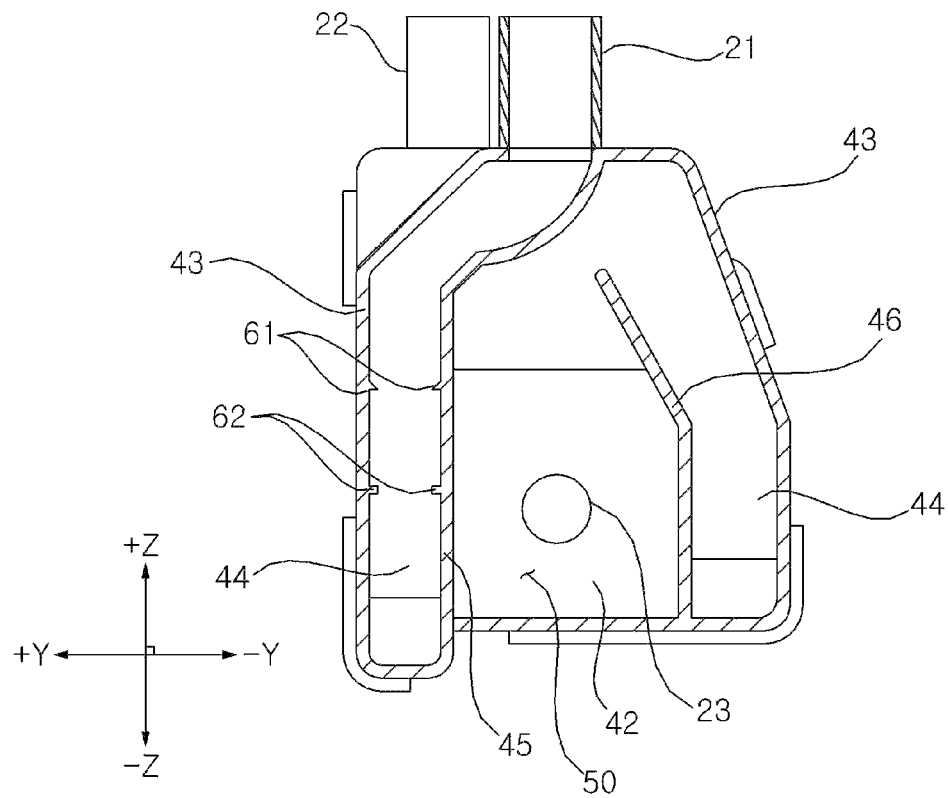
FIG. 5 is a cross-sectional view of a YZ plane of FIG. 4.
Figure 6:
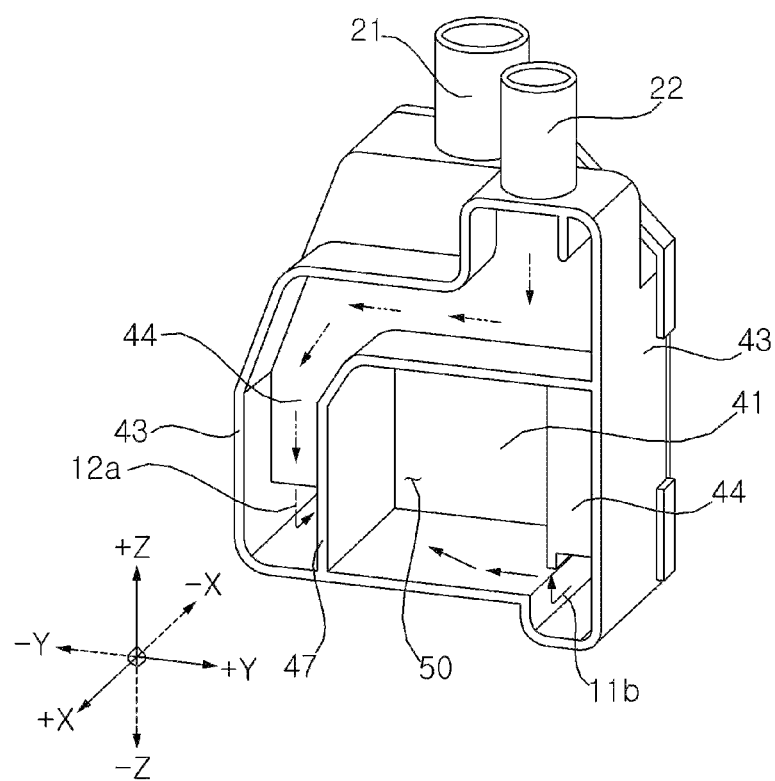
FIG. 6 is a perspective view of the condensate trap for a gas furnace of FIG. 3, from which a second cover is removed.
Figure 7:
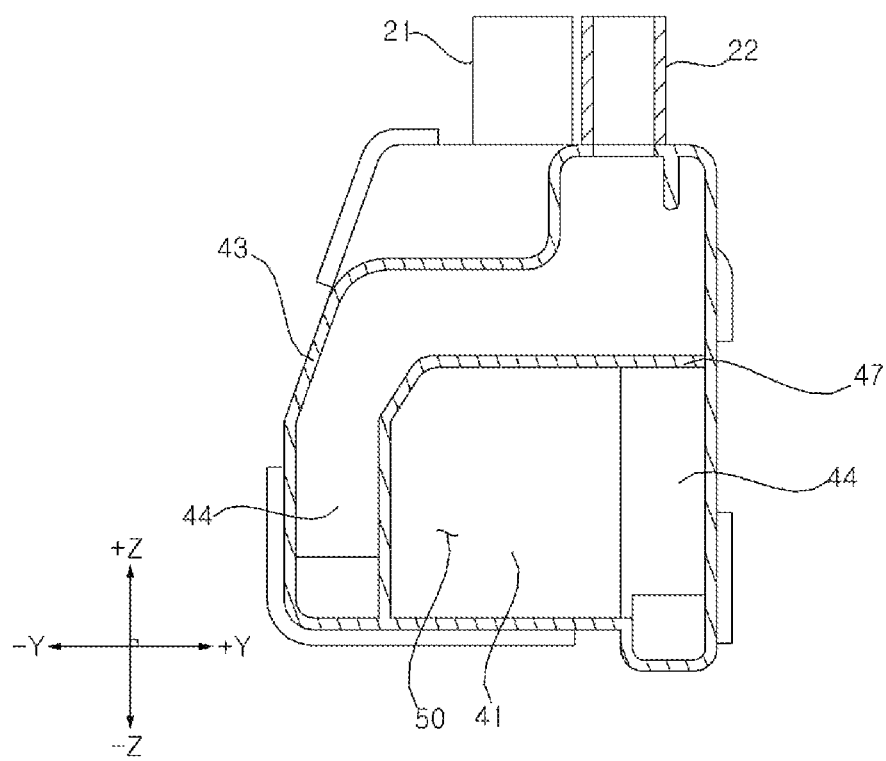
FIG. 7 is a cross-sectional view of a YZ plane of FIG. 6.

FIG. 2 is a perspective view of a portion of a gas furnace including a condensate trap for a gas furnace according to an embodiment of the present disclosure. FIG. 3 is a perspective view of a condensate trap for a gas furnace according to an embodiment of the present disclosure. FIG. 4 is a perspective view of the condensate trap for a gas furnace of FIG. 3, from which a first cover is removed. FIG. 5 is a cross-sectional view of a YZ plane of FIG. 4. FIG. 6 is a perspective view of the condensate trap for a gas furnace of FIG. 3, from which a second cover is removed. FIG. 7 is a cross-sectional view of a YZ plane of FIG. 6.

As illustrated in FIGS. 2 to 7, the condensate trap 10 for a gas furnace includes: a first inlet 21 through which the condensate generated in the heat exchanger 3 is introduced; a second inlet 22 through which the condensate generated in the exhaust pipe 6 is introduced; a first passage through which the condensate introduced from the first inlet 21 passes; a second passage through which the condensate introduced from the second inlet 22 passes; and a discharge port 23 through which the condensate having passed through the first and second passages is discharged to the outside.

The condensate trap 10 may collect the condensate generated when water vapor contained in the combustion gas P is condensed in the heat exchanger 3 or the exhaust pipe 6, and may discharge the collected condensate to the outside of the gas furnace 1.

As illustrated in FIG. 2, the condensate trap 10 may be connected to the condensate collecting part via the first inlet 21 and a first pipe 7 extending from the first inlet 21. The condensate trap 10 may be connected to the heat exchanger 3 via the condensate collecting part, to collect the condensate generated in the heat exchanger 3.

That is, the first inlet 21 is an inlet for the condensate in the heat exchanger.

The condensate trap 10 may be connected to the exhaust pipe 6 via the second inlet 22 and the second pipe 8 extending from the second inlet 22. The condensate trap 10 may be connected to the exhaust pipe 6 to collect the condensate generated in the exhaust pipe 6.

That is, the second inlet 22 is an inlet for the condensate in the pipe.

As illustrated in FIGS. 3 and 7, the first and second inlets 21 and 22 may be formed at an upper portion of the condensate trap 10, and the pipes 7 and 8 may extend in the +Z-axis direction from the first and second inlets 21 and 22, respectively.

The condensate generated in the heat exchanger 3 may pass through the first pipe 7 and the first inlet 21 in the −Z-axis direction by gravity, to be collected in the condensate trap 10.

The condensate generated in the exhaust pipe 6 may pass through the second pipe 8 and the second inlet 22 in the −Z-axis direction by gravity, to be collected in the condensate trap 10.

In this case, as illustrated in FIG. 2, the first and second pipes 7 and 8 may be formed to be elongated in the −Z-axis direction from the condensate collecting part and the exhaust pipe 6, respectively, such that the condensate trap 10 may be disposed below the condensate collecting part and the exhaust pipe 6. This arrangement may facilitate collection and discharge of the condensate in the condensate trap 10.

In FIG. 2 and other drawings, the first and second inlets 21 and 22 and the first and second pipes 7 and 8 have circular cross-sections but are not limited thereto.

The condensate trap 10 may have a plurality of passages formed by partition walls. The condensate collected in the condensate trap 10 may pass through the plurality of passages.

As illustrated in FIGS. 4 and 5, the first passage is a passage through which the condensate introduced from the first inlet 21 into the condensate trap 10 passes. The condensate generated in the heat exchanger 3 may pass through the first passage.

As illustrated in FIGS. 6 and 7, the second passage is a passage through which the condensate introduced into the condensate trap 10 from the second inlet 22 passes. The condensate generated in the exhaust pipe 6 may pass through the second passage.

The condensate trap 10 may include a casing 40 forming the exterior thereof, and a separation wall 44 and partition walls 45, 46, and 47 which are formed in the casing 40.

The casing 40 may include an edge surface 43, forming a side edge of the condensate trap 10, and covers 41 and 42 coupled to the edge surface 43 in the X-axis direction.

In order to specifically describe an internal structure of the condensate trap 10 including the first and second passages, it may be considered that the condensate trap 10 includes a first trap (not numbered) having the first passage formed therein and a second trap (not numbered) having the second passage formed therein.

The first trap may have the edge surface 43, formed by bending a plate a plurality of number of times, the first and second partition walls 45 and 46 disposed inwardly of the edge surface 43, and the first cover 41 coupled to the edge surface 43.

The second trap may have the edge surface 43, formed by bending a plate a plurality of number of times, the third partition wall 43 disposed inwardly of the edge surface 43, and the second cover 42 coupled to the edge surface 43.

The separation wall 44 may be disposed between the first and second traps. The first and second traps may be connected to each other with the separation wall 44 disposed therebetween. The first and second traps may be integrally formed with each other.

As illustrated in FIGS. 4 and 6, the first trap may be disposed in the −X axis direction based on the separation wall 44, and the second trap may be disposed in the +X axis direction based on the separation wall 44. In this case, the separation wall 44 may be a plate extending on the YZ plane.

As illustrated in FIGS. 4 to 7, the inside of the first trap, in which the first cover 41 is removed from the edge surface 43, may be open in the −X axis direction based on the separation wall 44, and the inside of the second trap, in which the second cover 42 is removed from the edge surface 43, may be open in the +X axis direction based on the separation wall 44.

As illustrated in FIG. 3, the first and second traps each having the edge surface 43, to which the first and second covers 41 and 42 are coupled, may communicate with the outside via the first and second inlets 21 and 22 and the discharge port 23.

The first and second covers 41 and 42 may be detachably coupled to the edge surface 43 via a coupling part (not numbered).

The coupling part may include a hook (not shown) installed on any one of the edge surface 43 and the first and second covers 41 and 42, and a hook hanger (not shown) installed on another one of the edge surface 43 and the first and second covers 41 and 42.

As the hook and the hook hanger are coupled to each other by hook-coupling, the first and second covers 41 and 42 may be detachably coupled to the edge surface 43, but are not limited thereto.

In the condensate trap 10, the first and second passages and a joint chamber 50 may be formed which are surrounded by the first to third partition walls 45, 46, and 47, the separation wall 44, the edge surface 43, and the first and second covers 41 and 42.

The first partition wall 45, forming the first passage, may extend from the circumference of the first inlet 21 in the overall −Z axis direction, to come into contact with a lower end of the first trap.

The separation wall 44, forming the first passage, may extend from the circumference of the first inlet 21 in the overall −Z direction, to be spaced apart from the lower end of the first trap by a predetermined distance.

The first passage may be formed by being surrounded by the edge surface 43, the separation wall 44, and the first partition wall 45, which extend from the circumference of the first inlet 21, and the first cover 41.

Based on the first passage, the first inlet 21 is disposed in the +Z axis direction; the lower end of the first trap is disposed in the −Z axis direction; the edge surface 43 is disposed in the +Y axis direction; the first partition wall 45 is disposed in the −Y axis direction; the separation wall 44 is disposed in the +X axis direction; and the first cover 41 is disposed in the −X axis direction.

The first passage may extend from the first inlet 21, formed at the upper end of the first trap, to the lower end of the first trap.

As indicated by a direction of an arrow designated by a reference numeral 11a in FIG. 4, the condensate introduced from the first inlet 21 may pass through the first passage to reach the lower end of the first trap.

In this case, the separation wall 44, forming the first passage, is spaced apart from the lower end of the first trap by a predetermined distance, such that the condensate reaching the lower end of the first trap may pass between the separation wall 44 and the lower end of the first trap.

As indicated by a direction of an arrow designated by a reference numeral 11b in FIG. 4, the condensate reaching the lower end of the first trap may flow in the +X axis direction to be collected in the joint chamber 50 which will be described later.

As illustrated in FIGS. 6 and 7, the third partition wall 47 forming the second passage may extend from one portion of the edge surface 43 which is spaced apart from the circumference of the second inlet 22 by a predetermined distance, to come into contact with a lower end of the second trap. However, the arrangement of the third partition wall 47 is not limited thereto.

The separation wall 44, forming the second passage, may extend from the circumference of the second inlet 22 in the overall −Z axis direction, to be spaced apart from the lower end of the second trap by a predetermined distance.

The second passage may be formed by being surrounded by the edge surface 43, the separation wall 44, and the third wall 47, which extend from the circumference of the second inlet 22, and the second cover 42.

Based on the second passage, the second inlet 22 is disposed in the +Z axis direction; the lower end of the second trap is disposed in the −Z axis direction; the third partition wall 47 is disposed in the +Y direction; the edge surface 43 is disposed in the −Y axis direction; the second cover 42 is disposed in the +X axis direction; and the separation wall 44 is disposed in the −X axis direction.

The second passage may extend from the second inlet 21, formed at the upper end of the second trap, to the lower end of the second trap.

As indicated by a direction of an arrow designated by a reference numeral 12a in FIG. 6, the condensate introduced from the second inlet 22 may pass through the second passage to reach the lower end of the second trap.

In this case, the separation wall 44, forming the second passage, is spaced apart from the lower end of the second trap by a predetermined distance, such that the condensate reaching the lower end of the second trap may pass between the separation wall 44 and the lower end of the second trap.

As indicated by a direction of an arrow designated by a reference numeral 12b in FIG. 4, the condensate reaching the lower end of the second trap may flow in the −X axis direction to be collected in the joint chamber 50 which will be described later.

The joint chamber 50 may be formed in the first and second traps. The joint chamber 50 may be formed so as not be blocked by the separation wall 44 disposed between the first and second traps. That is, the joint chamber 50 may be a space shared by the first and second traps.

The condensate, reaching the lower end of the first trap after passing through the first passage, may flow in the +X axis direction to be introduced into the lower end of the second trap. The condensate introduced into the lower end of the second trap may be collected in the joint chamber 50 formed in the second trap.

The condensate, reaching the lower end of the second trap after passing through the second passage, may flow in the −X axis direction to be introduced into the lower end of the first trap. The condensate introduced into the lower end of the first trap may pass through the second partition wall 46, extending from the lower end of the first trap in the overall +Z axis direction and being spaced apart from the upper end of the first trap by a predetermined distance, and may be collected in the joint chamber 50.

Here, it may be understood that the second partition wall 46 is designed considering that pressure of the condensate introduced through the second inlet 22 (i.e., condensate generated in the exhaust pipe 6) is higher than pressure of the condensate introduced through the first inlet 21 (i.e., condensate generated in the heat exchanger 3).

In the case where the discharge port 23 is formed at the second cover 42 coupled to the edge surface 43 of the second trap, the discharge port 23 may be formed at a position corresponding to the joint chamber 50.

That is, all the condensate introduced from the first and second inlets 21 and 22 may be collected into the joint chamber 50, to be discharged to the outside of the condensate trap 10 through the discharge port 23.

As pressure of the combustion gas P gradually decreases while the combustion gas passes through the passage formed in the heat exchanger 3, pressure of the combustion gas P at a combustion gas outlet of the heat exchanger 3 may be lower than atmospheric pressure.

When the gas furnace 1 is in operation, negative pressure is formed in the heat exchanger 3 compared to the atmospheric pressure, such that the outside air introduced through the second inlet 22 and the discharge port 23 may backflow into the first inlet 21.

Accordingly, at an early stage of the operation of the gas furnace 1, i.e., when the condensate is introduced from the first inlet 21 in an amount no greater than a predetermined amount, the outside air backflowing into the first inlet 21 may cause a problem in that the condensate generated in the heat exchanger 3 is collected into the condensate trap 10 through the first inlet 21 and may not be discharged to the outside.

The following description will be focused on a component of the present disclosure for solving the above problem.

Figure 8:
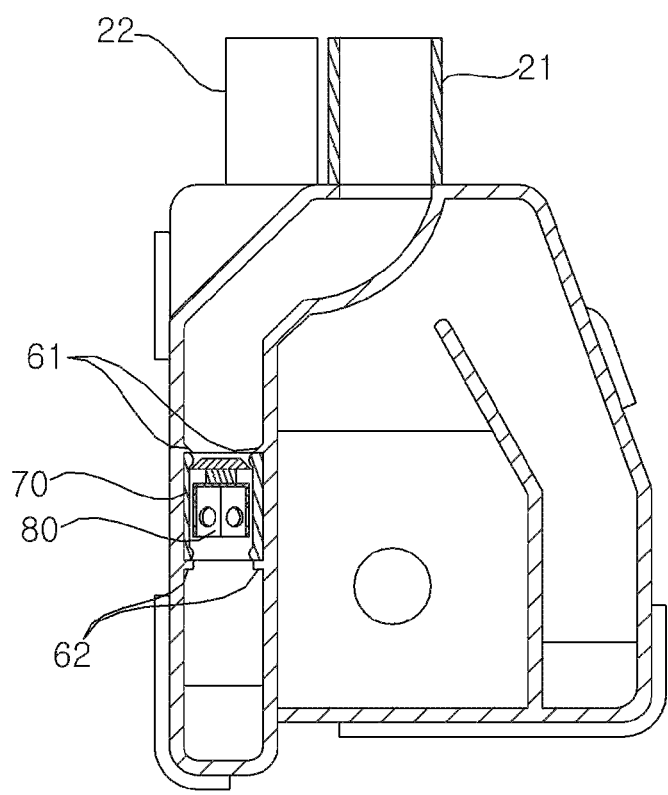
FIG. 8 is a diagram illustrating a configuration in which a backflow prevention device according to an embodiment of the present disclosure is added to FIG. 5.
Figure 9:
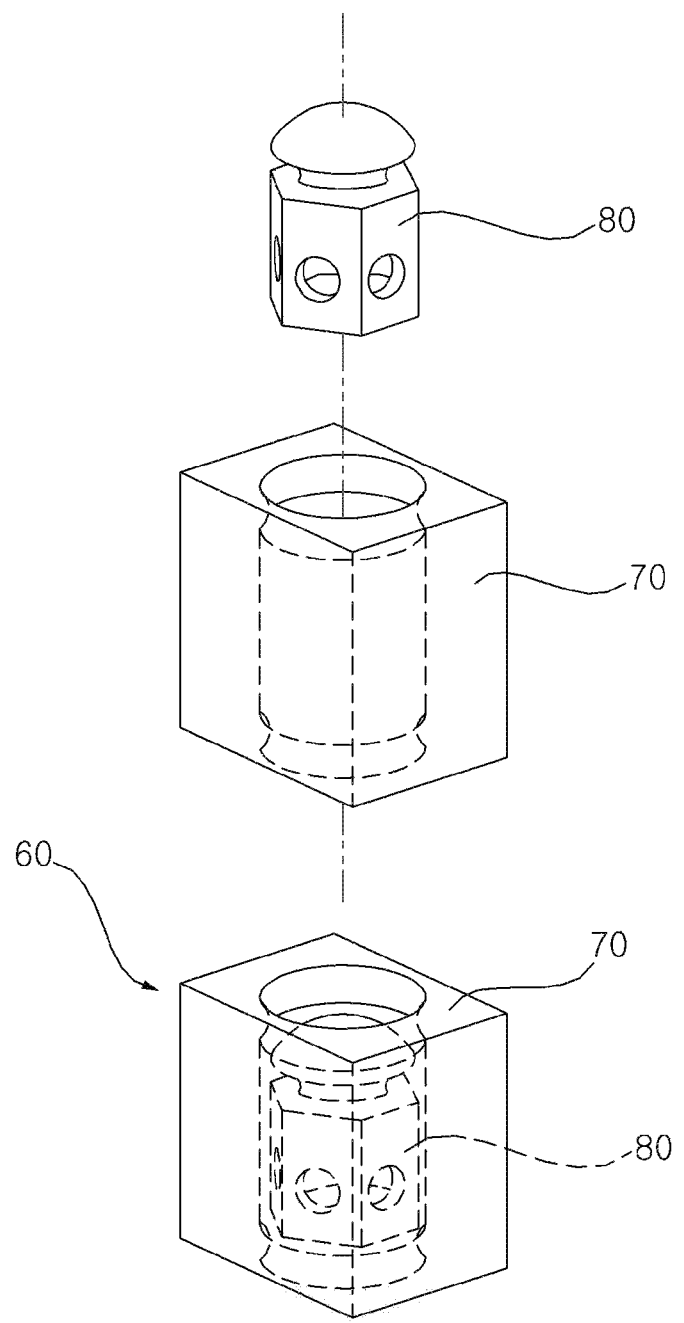
FIG. 9 is an assembly view of a backflow prevention device according to an embodiment of the present disclosure.
Figure 10:
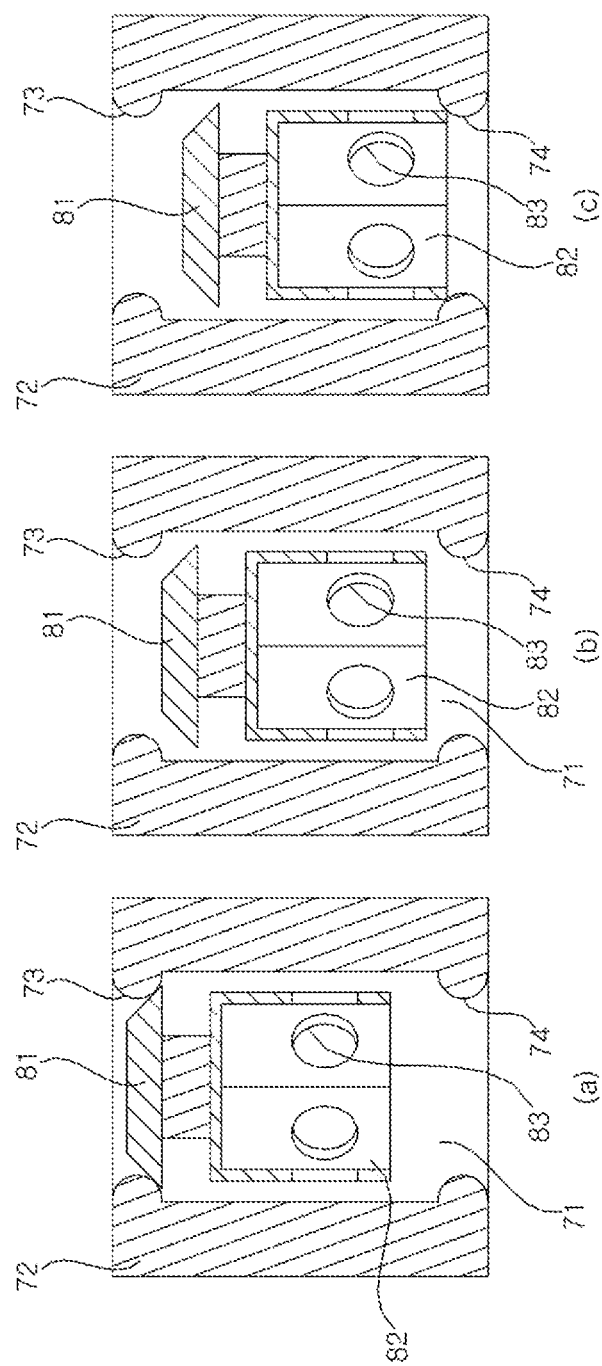
FIG. 10 is a diagram illustrating an upward or downward movement of a core according to an embodiment of the present disclosure.

FIG. 8 is a diagram illustrating a configuration in which a backflow prevention device according to an embodiment of the present disclosure is added to FIG. 5. FIG. 9 is an assembly view of a backflow prevention device according to an embodiment of the present disclosure. FIG. 10 is a diagram illustrating an upward or downward movement of a core according to an embodiment of the present disclosure.

Referring to FIGS. 8 to 10, the condensate trap 10 for the gas furnace includes the backflow prevention device 60.

The backflow prevention device 60 may be disposed on the first passage to prevent backflow of air.

The backflow prevention device 60 includes a housing 70, and a core 80 movably disposed in the housing 70 and preventing backflow of air by closing the first passage if an amount of the condensate introduced from the first inlet 21 is less than or equal to a predetermined amount.

Here, if an amount of the condensate stagnating in the housing 70 exceeds the predetermined amount, the core 80 may open the first passage, which will be described later in further detail.

An outer surface of the housing 70 may be pressed against each of the edge surface 43, the separation wall 44, the first partition wall 45, and the first cover 41 which form the first passage and which are opposite to the outer surface.

In other words, in order to correspond to the XY plane of the first passage which has a rectangular cross-section, an XY plane of the housing 70 may also have a rectangular cross-section, but the cross-sectional shape of the first passage and the housing 70 is not limited thereto.

The inside of the housing 70 may be fully filled except a portion where the core 80 is installed. That is, when the backflow prevention device 60 is installed in the first passage, the first passage may be opened or closed according to the position of the core 80 in the housing 70, which will be described in further detail below.

The housing 70 may be detachably connected to the first passage. The housing 70 may be fixed to the first passage by fixing parts 61 and 62 installed on the first passage.

As illustrated in FIGS. 4, 5, and 8, the fixing parts 61 and 62 are members protruding inwardly of the first passage, and the housing 70 may be detachably installed between the upper fixing part 61 and the lower fixing part 62.

However, the shape and position of the fixing parts 61 and 62 are not limited thereto, and the housing 70 may be fixed to the first passage by the fixing parts 61 and 62 using various fixing and coupling methods such as screw-coupling and the like.

The following description will be given of a method of installing the backflow prevention device 60 when the first cover 41 and the second cover 42 are coupled to the first trap and the second trap, respectively.

The backflow prevention device 60 may be installed in such a manner that the housing 70 is installed at the first passage so that the upper and lower fixing parts 61 and 62 may be installed at an upper end and a lower end of the housing 70 having the core 80 installed therein, and the first cover 41 is coupled to the edge surface 43 of the first trap.

In this manner, the housing 70 may be detachably coupled to the first passage without being integrally formed with the first passage, thereby providing high compatibility with other condensate trap for a gas furnace, and allowing easy assembly and separation, as well as providing convenience in repair and maintenance.

As illustrated in FIGS. 8 to 10, the housing 70 may include a housing body 72, an upper stopper 73, and a lower stopper 74.

The housing body 72 may have a tubular shape and a through hole 71 formed in a vertical direction.

In the housing body 72, a portion other than the through hole 71 is fully filled; and as described above, the outer surface of the housing body 72 is pressed against the components forming the first passage, such that the condensate introduced from the first inlet 21 should pass through the through hole 71.

The upper and lower stoppers 73 and 74 may protrude radially inward of upper and lower portions of the housing body 72, respectively, so as to limit upward and downward movements of the core 80.

That is, the core 80 may move vertically inside the through hole 71, but the upward and downward movements of the core 80 may be restricted by the upper and lower stoppers 73 and 74, respectively.

The outer surface of the core 80 may be spaced apart by a predetermined distance from an inner surface of the housing 70 except the upper and lower stoppers 73 and 74.

If the first passage is open, the condensate introduced from the first inlet 21 may pass through a space between the outer surface of the core 80 and the inner surface of the housing 70 except the upper and lower stoppers 73 and 74.

Accordingly, it is preferred that the outer surface of the core 80 is sufficiently spaced apart from the inner surface of the housing 70 except the upper and lower stoppers 73 and 74.

As illustrated in (a) of FIG. 10, the upper stopper 73 may be disposed at an upper part of the housing body 72 and may come into contact with the core 80, having moved upward by a predetermined distance, to restrict an upward movement of the core 80.

The upper stopper 73 may determine opening and closing of the first passage based on whether the upper stopper 73 comes into contact with a core head 81, and may prevent the core 80 from being upwardly separated from the housing 70.

For example, the upper stopper 73 may be in the form of a hyperboloid of one sheet. That is, the upper stopper 73 may have a rounded inner surface.

In this case, the shape may be more efficient to prevent damage to the upper stopper 73, which occurs upon contact with the core head 81, when compared to a case where the upper stopper 73 has an angular inner surface.

However, the shape of the upper stopper 73 is not limited thereto and may have another shape for restricting the upward movement of the core 80.

As illustrated in (c) of FIG. 10, the lower stopper 74 may be disposed at a lower part of the housing body 72, and may come into contact with the core 80, having moved downward by a predetermined distance, to restrict a downward movement of the core 80.

The lower stopper 74 may come into contact with the core body 82, which will be described later, to prevent the core 80 from being downwardly separated from the housing 70.

For example, the lower stopper 74 may be in the form of a hyperboloid of one sheet. That is, the lower stopper 74 may have a rounded inner surface.

In this case, the shape may be more efficient to prevent damage to the lower stopper 74, which occurs upon contact with the core body 82, when compared to a case where the lower stopper 74 has an angular inner surface.

However, the shape of the lower stopper 74 is not limited thereto and may have another shape for restricting the downward movement of the core 80.

The core 80 may include the core head 81 and the core body 82.

The core head 81 may come into contact with the upper stopper 73. That is, the core 80, having moved upward by a predetermined distance, comes into contact with the upper stopper 73, such that the core 80 may no longer move upward.

The core head 81 may have an upper surface having a flat plate shape. As a result, the core head 81 may close the through hole 71 while being in contact with the upper stopper 73, thereby closing the first passage.

When the core head 81 is not in contact with the upper stopper 73, the through hole 71 is open, thereby opening the first passage.

When the upper stopper 73 is in the form of a hyperboloid of one sheet, the core head 81 may have a truncated cone shape, but the shape is not limited thereto.

The core body 82 is disposed below the core head 81 and may have a bottom surface coming into contact with the lower stopper 74.

That is, after the core 80 moves downward by a predetermined distance, the bottom surface of the core body 82 comes into contact with the lower stopper 74 and thus may no long move downwardly.

The core body 82 may be formed as a plate body having a hollow portion with a closed upper part and an open lower part.

At least one body hole 83 may be formed on a side surface of the core body 82, so that the condensate introduced from the first inlet 21 may pass through the hollow portion of the core body 82.

For example, as illustrated in FIG. 9, the core body 82 may have a hollow hexagonal shape, and the body hole 83 may have a circular shape, but the shapes are not limited thereto.

The hollow portion of the core body 83 may communicate with the through hole 71 and the first passage through the body hole 83.

Further, as described above, the outer surface of the core 80 is spaced apart by a predetermined distance from the inner surface of the housing 70 except the upper and lower stoppers 73 and 74, such that in the case where the upper stopper 73 is not in contact with the upper stopper 73 and the through hole 71 and the first passage are open, the condensate introduced from the first inlet 21 may pass through the first passage via the housing 70.

In addition, as described above, if an amount of the condensate introduced from the first inlet 21 is less than or equal to a predetermined amount, the core head 81 may move upward to come into contact with the upper stopper 73, thereby closing the through hole 71 and the first passage.

Specifically, if an upward force transmitted to the core 80 by outside air flowing through the second inlet 22 and the discharge port 23 is greater than a sum of weight of the core 80 itself, weight of the condensate stagnating between the first inlet 21 and the core head 81, and a downward force transmitted from the inside of the heat exchanger 3 to the core 80, the core 80 moves upward such that the core head 81 may be pressed against the upper stopper 73, as illustrated in (a) of FIG. 10.

Accordingly, even when negative pressure is formed in the heat exchanger 3 during the operation of the gas furnace 1, it is possible to prevent the outside air, introduced through the second inlet 22 and the discharge port 23, from backflowing into the first inlet 21.

As described above, if an amount of the condensate introduced through the first inlet 21 exceeds the predetermined amount, the core head 81 moves downward so as not to come into contact with the upper stopper 73, such that the through hole 71 and the first passage may be open.

Specifically, if an upward force transmitted to the core 80 by outside air flowing through the second inlet 22 and the discharge port 23 is less than a sum of weight of the core 80 itself, weight of the condensate stagnating between the first inlet 21 and the core head 81, and a downward force transmitted from the inside of the heat exchanger 3 to the core 80, the core 80 moves downward such that the bottom surface of the core body 82 may be pressed against the lower stopper 73, as illustrated in (c) of FIG. 10.

That is, under the condition that the condensate generated in the heat exchanger 3 is collected sufficiently in the condensate trap 10, such that a problem of the backflow of the outside air into the first inlet 21 does not occur, the backflow prevention device 60 may open the first passage.

Figure 11:
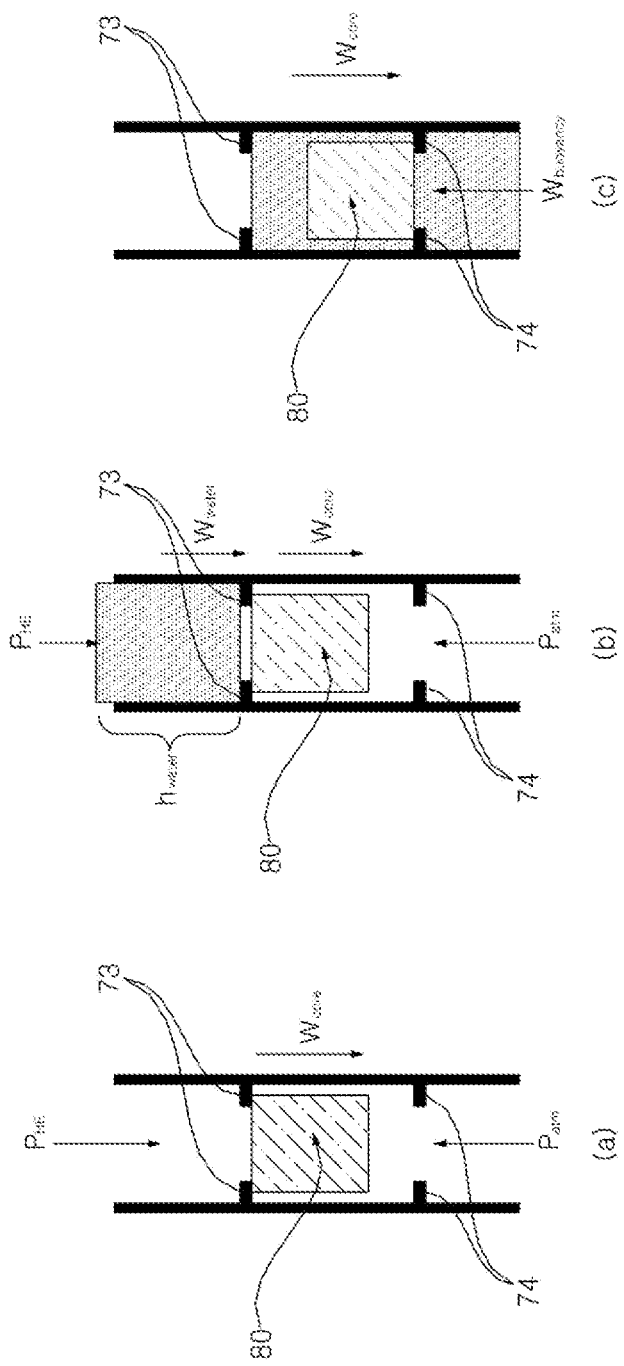
FIG. 11 is a diagram illustrating conditions of a core according to an embodiment of the present disclosure.

FIG. 11 is a diagram illustrating conditions of a core according to an embodiment of the present disclosure.

Conditions of the core 80 for smoothly performing the above operations will be described below with reference to FIG. 11.

First, if it is required to prevent the backflow of air at an early stage of the operation of the gas furnace 1, the core 80 should move upward so that the core head 81 may come into contact with the upper stopper 73.

That is, the core 80 may be designed so that an upward force (term of the left side of the following Equation 1) transmitted to the core 80 is greater than a downward force (term of the right side of the following Equation 1) transmitted to the core 80.

$$A_{flow}P_{atm} > A_{flow}P_{HE} + \rho_{core}gV_{core} \qquad \text{Equation 1}$$

Herein, Aflow denotes a cross-sectional area of the first passage; Patm denotes atmospheric pressure; PHE denotes internal pressure of the heat exchanger 3; Pcore denotes the density of the core 80; Vcore denotes the volume of the core 80; and g denotes gravitational acceleration.

The above Equation 1 may be arranged to the following Equation 2.

$$\rho_{core}V_{core} < A_{flow}(P_{atm} - P_{HE})/g \qquad \text{Equation 2}$$

Under the above condition, the core 80 may prevent backflow of the outside air into the first inlet 21 by closing the first passage.

Second, if the condensate is collected to a predetermined level above the core head 81 as the gas furnace 1 operates, the core 80 should move downward so that the core head 81 may escape from the upper stopper 73.

The positions of the housing 70 and the upper stopper 73 on the first passage are determined by the positions of the fixing parts 61 and 62, such that the height of the condensate collected above the core head 81 may be limited to a predetermined height.

That is, the core 80 may be designed so that an upward force (term of the left side of the following Equation 3) transmitted to the core 80 is less than a downward force (term of the right side of the following Equation 3) transmitted to the core 80.

$$A_{flow}P_{atm} < A_{flow}P_{HE} + \rho_{core}gV_{core} + \rho_{water}A_{flow}gh_{water} \qquad \text{Equation 3}$$

Herein, pwater denotes the density of the condensate, and hwater denotes a maximum height of the condensate to which the condensate may be collected above the core head 81.

Further, the above Equation 3 may be arranged to the following Equation 4.

$$\rho_{core}V_{core} > A_{flow}(P_{atm} - P_{HE})/g - \rho_{water}A_{flow}h_{water} \qquad \text{Equation 4}$$

Third, the core 80 is required to be maintained in contact with the lower stopper 74, so that the condensate generated during the operation of the gas furnace 1 may be smoothly collected in the condensate trap 10 and discharged therefrom.

That is, in order for the core 80 to come into contact with the lower stopper 74 without floating when the condensate is accumulated such that the core 80 is submerged in the condensate, the density of the core 80 may be designed to be greater than the density of the condensate, as shown in the following Equation 5.

$$\rho_{core} > \rho_{water} \qquad \text{Equation 5}$$

Under the above condition, the core 80 may open the through hole 71 and the first passage, so that the condensate generated in the heat exchanger 3 may be collected in the joint chamber 50 by passing through the housing 70, and may be discharged to the outside through the discharge port 23.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

The invention claimed is:

1. A condensate trap for a gas furnace for collecting and discharging condensate generated in a heat exchanger and an exhaust pipe, the condensate trap comprising:
    a first inlet through which the condensate generated in the heat exchanger is introduced;

a second inlet through which the condensate generated in the exhaust pipe is introduced;

a first passage through which the condensate introduced from the first inlet passes;

a second passage through which the condensate introduced from the second inlet passes;

a discharge port through which the condensate, having passed through the first passage and the second passage, is discharged outside; and a backflow prevention device disposed on the first passage and configured to prevent backflow of air, wherein the backflow prevention device comprises:

a housing; and a core which is movably disposed in the housing, and which in response to an amount of the condensate introduced from the first inlet being less than or equal to a predetermined amount, prevents backflow of the air by closing the first passage, wherein the housing comprises:

a housing body having a tubular shape and a through hole formed in a vertical direction; and upper and lower stoppers protruding radially inward of upper and lower portions of the housing body, respectively, so as to limit upward and downward movements of the core, wherein the core comprises:

a core head coming into contact with the upper stopper to close the through hole; and a core body disposed below the core head and having a bottom surface coming into contact with the lower stopper, wherein the core body comprises a hollow portion with a closed upper part and an open lower part, wherein at least one body hole is formed on the core body, so that the condensate introduced from the first inlet passes through the hollow portion of the core body.

2. The condensate trap of claim 1, wherein the respective upper and lower stoppers have rounded inner surfaces.

3. The condensate trap of claim 1, wherein the core head has an upper surface having a flat plate shape.

4. The condensate trap of claim 1, wherein the at least one body hole is formed on a side surface of the core body.

5. The condensate trap of claim 1, wherein an outer surface of the core is spaced apart by a predetermined distance from an inner surface of the housing.

6. The condensate trap of claim 1, further comprising upper and lower fixing parts protruding inwardly of the first passage, wherein the housing is detachably installed between the upper and lower fixing parts.

7. The condensate trap of claim 1, further comprising a cover having the discharge port formed on one side.

8. The condensate trap of claim 1, wherein density of the core is higher than density of the condensate generated in the heat exchanger and the exhaust pipe.

* * * * *